Sept. 9, 1969        G. E. KEEFER        3,466,160
MOLTEN ADDITIVE DISTRIBUTOR FOR GLASS
Filed July 1, 1966        2 Sheets-Sheet 1
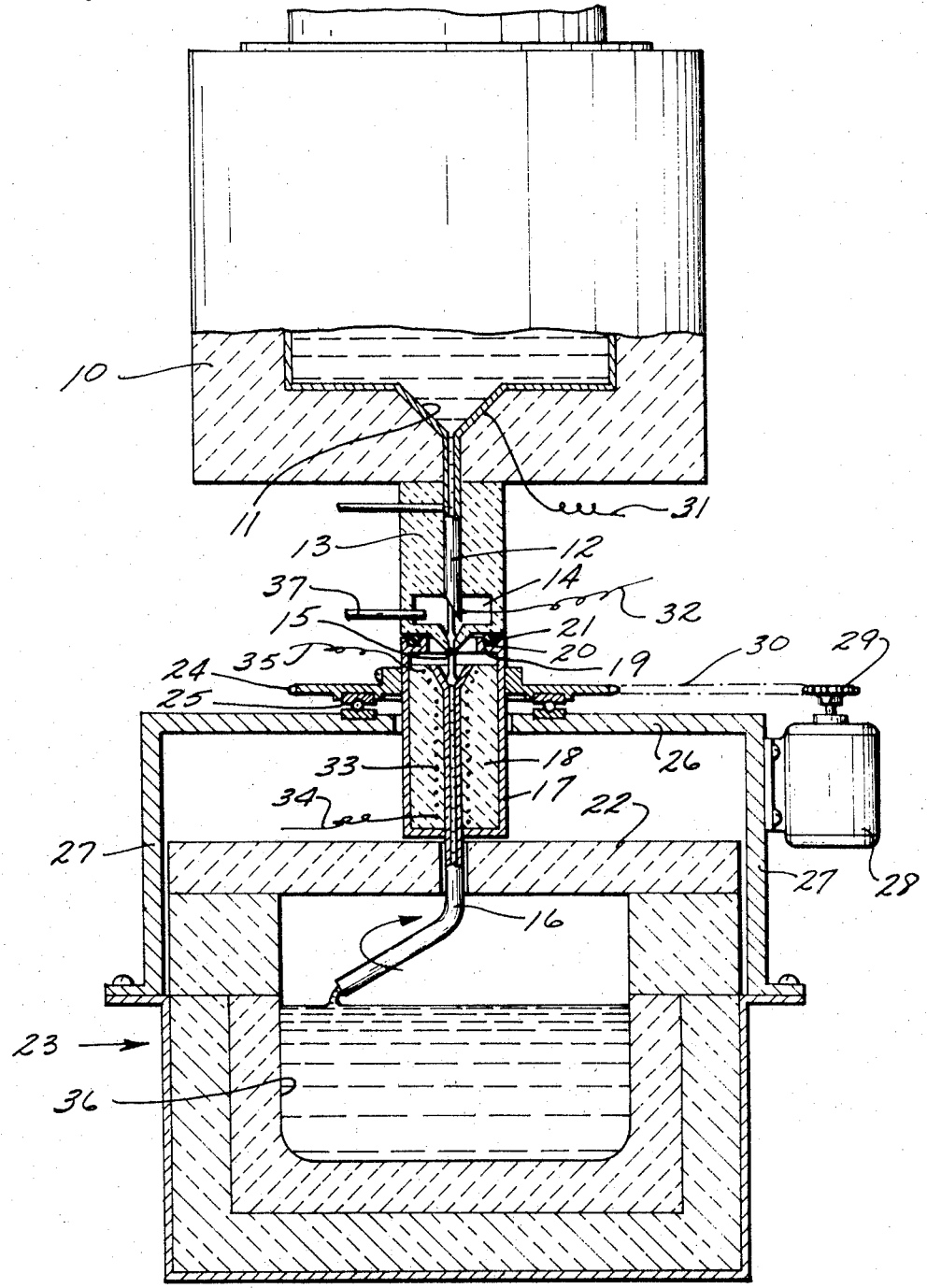
INVENTOR.
GEORGE E. KEEFER
BY
*D. T. Innis*
*W. A. Schaich*
ATTORNEYS

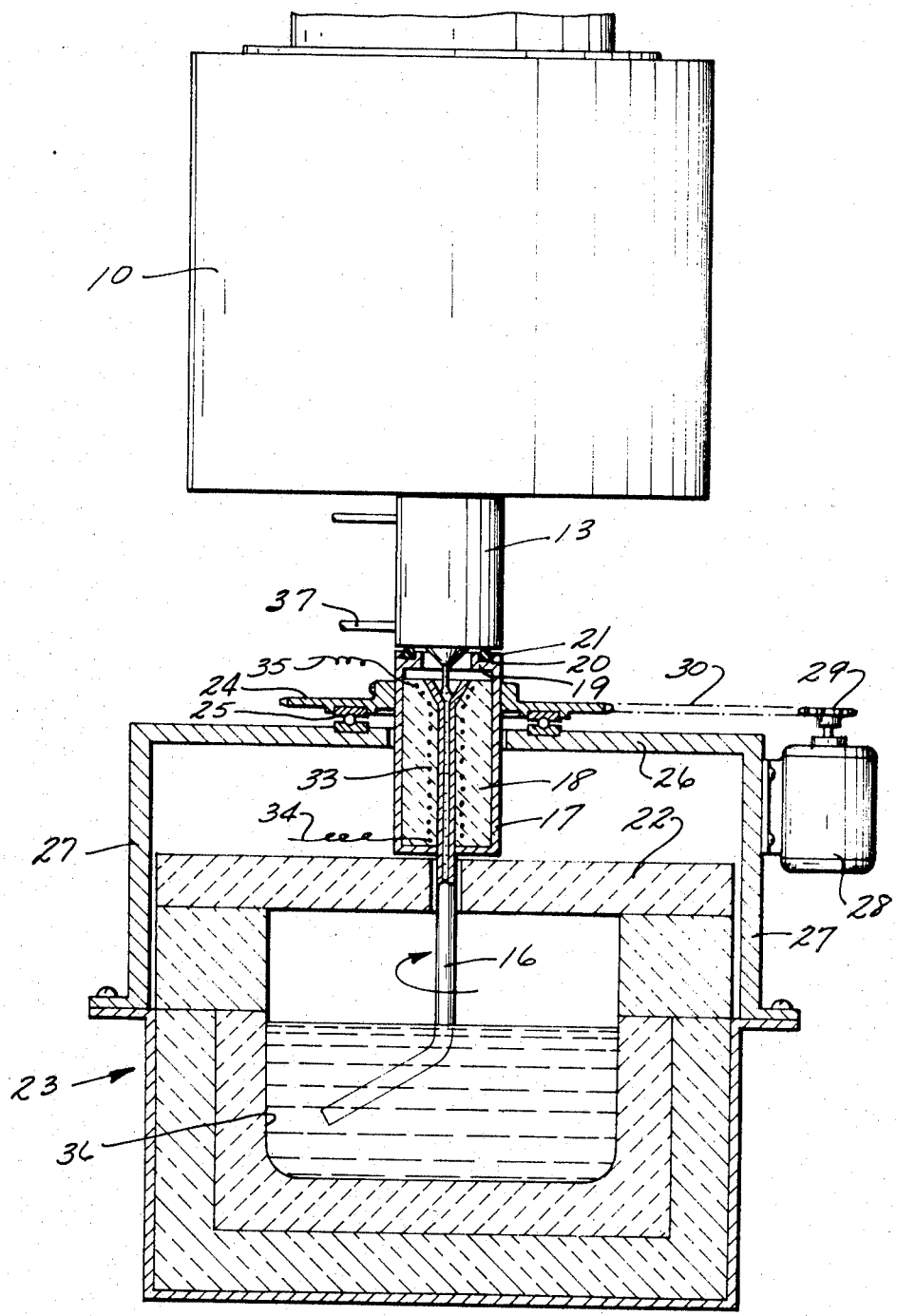

United States Patent Office 3,466,160
Patented Sept. 9, 1969

3,466,160
MOLTEN ADDITIVE DISTRIBUTOR FOR GLASS
George E. Keefer, Toledo, Ohio, assignor to Owens-Illinois, Inc., a corporation of Ohio
Filed July 1, 1966, Ser. No. 562,341
Int. Cl. C03b 5/18
U.S. Cl. 65—157                      6 Claims

ABSTRACT OF THE DISCLOSURE

The addition of a molten additive or frit to a forehearth containing a flowing stream of molten glass, is carried out by providing a frit melter mounted above the forehearth with a heated discharge tube extending downwardly therefrom to discharge into the upper end of a distributing tube in the form of a pipe having its lower end extending through the forehearth cover and being bent at an angle so that upon rotation of the second heated tube the molten additive will be spread over a large area of the surface of the glass in the forehearth. A second embodiment involves the use of a longer second tube having its lower end submerged in the molten glass stream, so that it serves, not only as a distributor of molten additive but also as a stirrer.

---

This invention relates to apparatus for distributing a molten additive such as colored enriched glass to a container of molten colorless glass.

Specifically, this invention relates to a molten frit distributing mechanism in combination with a forehearth and in one embodiment includes an arrangement for physically stirring the molten addition within the forehearth.

It has been the practice in the past when attempting to color relatively clear glass in a forehearth channel to add a small quantity of highly colored granular material, generally a glass, to the surface of the molten stream of clear glass. This prior practice would require that the granular material be melted by raising its temperature to the equivalent of the stream of glass and heating of the entire stream sufficiently high in temperature so as to facilitate mixing of the colorant and clear glass by various types of mechanical stirrers and bubblers.

In the operation of this prior process, it was necessary that the added coloring material be compatible with the glass to which it was added, such that there is no chemical reaction which would release gases to make bubbles in the glass or to form crystals or other solid residue which might detract from the appearance of the color of the modified glass.

Because the material added was cold in relation to the stream of glass flowing through the forehearth, a considerable amount of heat input was required to melt the additive.

Since the added material was essentially granular particles, there would be some gaseous entrapment during the melting as a result of the irregular shapes of the grains and minute cracks included in the particles of the additive. Usually, there would also be included minute amounts of abraded iron and organic contaminants in the additive particles which caused reactions with the molten glass to which they were added resulting in undesirable chemical reactions and bubble formation.

A further drawback of my prior process was the limitation with respect to the quantity of cold granular additive which could be added to the molten glass. Only limited quantities could be used because of the increase in formation of bubbles and also because of the difficulty of applying the melting heat in the limited time necessary to complete the melting.

A further limitation in the amount of cold additive which could be introduced into the molten glass was the fact that any increase in quantity would result in an increased entrapment of gases, thus producing the increase in bubble formation. In fact, it is an object of this invention to provide apparatus which will handle molten additive glass such as highly color enriched frit directly into the zone above a forehearth channel, which apparatus distributes the molten additive over substantially the full width of the channel.

It is a further object of this invention to provide apparatus for introducing molten additive glass into a forehearth channel such that the additive glass is introduced beneath the surface of the glass in the forehearth in the glass channel.

It is a still further object of this invention to provide apparatus which adds the molten color additive beneath the surface of the glass in the forehearth channel and physically mixes the molten additive while it distributes the molten additive glass throughout substantially the full width of the forehearth channel.

Other and further objects will be apparent from the following description taken in conjunction with the annexed sheet of drawings, wherein:

FIG. 1 is a vertical, cross-sectional view of the apparatus of the invention; and, FIG. 2 is a vertical, sectional view of the second embodiment of the apparatus of the invention.

With particular reference to FIG. 1, the lower end of a melter 10, having a conical exit port 11 formed in the bottom thereof, is provided with an elongated metallic tube 12 which extends downwardly and is intended to deliver molten additive glass at a selected rate. The tube 12 is insulated by a suitable ceramic material 13 with the lower end of the insulator 13 being formed with an enlarged chamber 14 surrounding the lower end of the tube 12. The chamber 14 has its bottom surface formed in a downwardly converging frusto-conical outlet 15 through which the molten glass issuing from the tube 12 is adapted to flow.

The above described portion of the apparatus of the invention is stationary and a second tube 16, having a conical upper end and supported within a metal casing 17 by a ceramic insulating material 18, is mounted in coaxial alignment with the opening 15 in the upper insulating member 13. The upper edge of the casing 17 is provided with an inwardly extending gasket retaining portion 19. The gasket retaining portion takes the form of an annular member having an annular groove 20 formed therein within which a toroidal sealing ring 21 is seated. The sealing ring 21 is adapted to seat against the lower surface of the insulating member 13 and to provide essentially a gas-tight, rotary seal therewith.

The tube 16, as shown in FIG. 1, extends downwardly in substantially a straight line until passing through a cover member 22 of a forehearth, generally designated 23, where the end is bent outwardly.

The metal casing 17 is supported in its operative position by a circular plate 24 riding on bearing means 25 which in turn are supported on a generally horizontal plate 26. The plate 26 is supported above the cover 22 of the forehearth by supporting members 27. As can readily be seen, the supporting members 27 are mounted to the sides of the forehearth structure with the plate 26 bridging the width of the forehearth. A motor 28 mounted to the plate 27 carries a drive sprocket 29 in mesh with a drive chain 30 which in turn is in mesh with sprocket teeth formed on the periphery of the circular plate 24.

In order to provide temperature control over the molten frit or additive glass which is flowing from the melter 10, the tube 12 is connected by a pair of leads 31 and 32 to a suitable source of current. The tube 16 is controlled as to its temperature by the fact that a resistance heater element 33 imbedded in the ceramic insulating material 18 surrounds the tube and extends through substantially the entire length of that portion of the tube which is above the cover 22. The resistance heating element 33 is connected by slip rings to a suitable source of current through leads 34 and 35.

It should be understood that the forehearth 23 is of the usual type having a channel 36 formed therein through which the molten matrix glass is adapted to flow from a melter to the feeder or point of utilization of the glass. By providing a tube having an outwardly extending lower end which is mounted for rotation about its vertical axis, it can readily be seen that applicant has provided an arrangement which will distribute molten frit or additive glass to the upper surface of the matrix glass flowing in the forehearth 23 in a circular pattern at any desired rate. The tube 16 may either be continuously rotated at a constant speed or cycled at varying speeds, depending upon the desired pattern of discharging the additive glass to the matrix glass.

Turning now to FIG. 2, it can be seen that the apparatus is essentially the same as that described above; however, in this embodiment, the tube 16 is of greater length than the tube shown in FIG. 1, so that the lower end of the tube extends beneath the surface of the matrix glass. In this embodiment the molten additive glass is introduced to the matrix glass beneath the surface thereof. Furthermore, by reason of the fact that the distributing tube 16 is being rotated, there is the additional benefit of stirring realized.

While the apparatus of the invention has been specifically described with respect to its aspects as a device for distributing molten additives to a forehearth, it should be readily appreciated that the device may have wider application, particularly where it may be desirable to add a molten additive glass to a pot of molten glass.

The apparatus of the invention has particular utility when used in combination with the gas fired frit melter described in co-pending application Ser. No. 550,789, filed May 17, 1966.

As described in the co-pending application referred to above, it is sometimes desirable to provide only a preselected atmosphere for the molten frit prior to its addition to the matrix glass. With this in mind, applicant has provided a pipe 37 which extends into the chamber 14. The pipe 37 may be utilized to feed selected gases such as $O_2$, $N_2$, $CO_2$, $H_2$ or CO, or a combination thereof.

With this arrangement, and in particular when the invention is utilized in conjunction with the melter of applicant's above-referred-to pending application, contaminating gases may be prevented from reaching the molten frit glass and depending upon the type or color of molten additive being produced, applicant may select an oxidizing, inert or reducing gas atmosphere.

I claim:
1. In combination with a forehearth containing a flowing stream of molten glass to which a molten glass additive is to be introduced, said forehearth having a cover, of a molten glass additive distributor mounted above the forehearth, comprising a first downwardly extending metallic tube through which the molten additive is adapted to flow, means surrounding the lower end of said tube and forming a chamber therearound, means associated with said first tube for heating said tube, a second tube positioned beneath said first tube and having an open upper end communicating with said chamber, the lower portion of said second tube extending through an opening in said cover, said lower portion being bent angularly with respect to the common axis of said tubes between said cover and the surfaces of said flowing stream, means surrounding said second tube for heating that portion of said second tube disposed above the cover of said forehearth, means for mounting said second tube for rotational movement about its axis, means for rotating said second tube, and means interposed between said first tube and said tube providing a rotary seal between said tubes.

2. The apparatus of claim 1, further including means communicating with said chamber for introducing a selected gaseous atmosphere thereto.

3. The apparatus of claim 1, wherein the lower end portion of said second tube extends beneath the surface of the glass in the forehearth.

4. The apparatus of claim 1, wherein said first tube is formed of a conductive metal and said heating means therefore comprises electrical power leads connected to opposite ends of said first tube for supplying electrical current thereto for resistance heating thereof.

5. The apparatus of claim 1, wherein said means surrounding the second tube comprises a wound wire resistance element having an insulating cover and said resistance element being mounted for rotation with said second tube.

6. In combination with a covered forehearth containing a flowing stream of molten glass to which a molten glass additive is to be introduced, of a molten glass additive distributor mounted above the forehearth, comprising a first, downwardly extending metallic tube through which the molten additive is adapted to flow, means surrounding the lower end of said tube and forming a chamber therearound, means connected to said chamber for introducing a selected gaseous atmosphere thereto, means connected to said first tube for heating said tube, a second tube positioned beneath said first tube and having an open upper end, the lower end of said second tube extending through an opening in the cover of said forehearth, said lower end extending downwardly and outwardly with respect to the common axis of said tubes, means surrounding said second tube for heating that portion of said second tube which extends above the cover of said forehearth, means for mounting said second tube for rotational movement about its axis, and means interposed said first tube and said second tube providing a rotary seal between said tubes.

References Cited
UNITED STATES PATENTS

| 1,928,598 | 9/1933 | Morton et al. | 65—335 XR |
| 2,268,546 | 1/1942 | Forter | 65—335 XR |

FOREIGN PATENTS 651,687  10/1937  Germany.

S. LEON BASHORE, Primary Examiner

FRANK W. MIGA, Assistant Examiner

U.S. Cl. X.R.

65—121, 134, 335, 346, 347